United States Patent [19]
Yee et al.

[11] Patent Number: 5,490,427
[45] Date of Patent: Feb. 13, 1996

[54] SIX AXIS FORCE SENSOR EMPLOYING MULTIPLE SHEAR STRAIN GAGES

[75] Inventors: Albert G. Yee, Fremont, Calif.; Hadi A. Akeel, Rochester Hills, Mich.

[73] Assignee: Fanuc USA Corporation, Elkgrove Village, Ill.

[21] Appl. No.: 324,414

[22] Filed: Oct. 17, 1994

[51] Int. Cl.$^6$ ............................................. G01L 5/16
[52] U.S. Cl. .................... 73/767; 73/781; 73/815; 73/855
[58] Field of Search ................... 73/763, 767, 768, 73/774, 781, 815, 819, 855, 866.5

[56] References Cited

U.S. PATENT DOCUMENTS

| | | | |
|---|---|---|---|
| 2,768,526 | 10/1956 | Trimble et al. | 73/781 |
| 2,813,958 | 11/1957 | MacDonald | 73/781 |
| 2,855,489 | 10/1958 | Ruge | 73/781 |
| 3,228,240 | 1/1966 | Ormond | 73/767 |
| 3,273,382 | 9/1966 | Fonash | 73/767 |
| 3,280,623 | 10/1966 | Saxl | 73/767 |
| 3,286,513 | 11/1966 | Wasiutynski | 73/767 |
| 3,376,921 | 4/1968 | McManry et al. | 73/781 |
| 3,693,425 | 9/1972 | Starita et al. | |
| 3,853,000 | 12/1974 | Barnett et al. | 73/763 |
| 4,094,192 | 6/1978 | Watson et al. | |
| 4,448,083 | 5/1984 | Hayashi | |
| 4,640,138 | 2/1987 | Meyer et al. | |
| 4,823,618 | 4/1989 | Ramming | |
| 4,862,751 | 9/1989 | Asakawa et al. | |
| 4,911,023 | 3/1990 | Izumi et al. | |
| 4,911,024 | 3/1990 | McMaster | |
| 4,936,149 | 6/1990 | Jacobson | 73/768 |
| 5,063,788 | 11/1991 | Ch'Hayder et al. | |
| 5,129,265 | 7/1992 | Bartels et al. | |
| 5,394,757 | 3/1995 | Workman et al. | 73/866.5 |

OTHER PUBLICATIONS

McGraw–Hill Encyclopedia of Physics, pp. 354–356, 1983.
Quinn, T. P.; and Mote, Jr., C. D.; "Optimal Design of an Uncoupled Six Degree of Freedom Dynamometer", pp. 40–48, Mar. 1990.

Primary Examiner—Richard Chilcot
Assistant Examiner—G. Dombroske
Attorney, Agent, or Firm—Hickman & Beyer

[57] ABSTRACT

A force sensor is disclosed in which strain is measured exclusively by shear strain gages mounted on L or T-shaped legs. Each such leg has at least two arms which are orthogonal to one another. That is, the arms of the L or T each have a lengthwise or longitudinal axis, and two of these longitudinal axes are oriented at approximately 90° with respect to one another. Each leg also has at least two shear strain gages mounted on orthogonal arms to measure forces in orthogonal directions. Three or more of these L or T shaped legs are integrated in a generally cylindrical and hollow body defining the force sensor. The shear strain gage outputs from the arms of this structure are sent to a digital signal processor which determines the magnitude and direction of any force/moment applied to the cylindrical body. Further, the shear strain gages are mounted in pockets sized to hold the strain gages and provide increased sensitivity to shear strain.

25 Claims, 9 Drawing Sheets

$$F = \begin{bmatrix} F_x & F_y & F_z & M_x & M_y & M_z \\ 0 & 0 & -20000 & 0 & 20000 & 0 \\ 0 & 0 & -20000 & 0 & -200000 & 0 \\ 0 & 0 & -20000 & 20000 & 0 & 0 \\ 0 & 0 & -20000 & -20000 & 0 & 0 \\ 20000 & 0 & -20000 & 0 & 0 & 200000 \\ 20000 & 0 & 0 & 0 & 180000 & 0 \\ 10000 & 0 & 0 & 0 & 290000 & 0 \\ 0 & 0 & 0 & 0 & 0 & 200000 \\ 0 & 20000 & 0 & 0 & 0 & -200000 \\ 0 & 20000 & 0 & -180000 & 0 & 0 \\ 0 & 20000 & 0 & -290000 & 0 & 0 \\ 0 & 10000 & 0 & 0 & 0 & 0 \end{bmatrix}$$

270

$$V = \begin{bmatrix} \underline{251} & & \underline{252} & & \underline{253} & & \underline{254} & \\ V & H & V & H & V & H & V & H \\ 12 & 2587 & -542 & -140 & -56 & -4054 & 497 & -1040 \\ -20 & -3929 & 596 & -1085 & 10 & 2658 & -501 & -145 \\ 13 & -621 & 19 & -633 & -15 & -662 & -4 & -646 \\ -548 & -121 & -20 & -3989 & 502 & -1050 & 45 & 2589 \\ 578 & 1068 & 6 & 2588 & -520 & -152 & -37 & -3949 \\ 2407 & -31 & 3867 & -1326 & 2508 & -1659 & 959 & -411 \\ 22 & 3708 & 940 & -49 & 37 & -3881 & 1075 & 130 \\ 53 & 5085 & -108 & 459 & 21 & -5338 & -36 & -352 \\ 965 & -380 & 2366 & -54 & 4034 & -1333 & -2480 & -1687 \\ -3901 & 1359 & -2458 & 1695 & -965 & 364 & -2467 & 49 \\ -938 & 95 & -57 & 3775 & 1077 & -63 & -47 & -3795 \\ 100 & -375 & -47 & 5133 & 30 & 439 & -92 & -5173 \end{bmatrix}$$

SIX AXIS FORCE SENSOR EMPLOYING MULTIPLE SHEAR STRAIN GAGES

BACKGROUND OF THE INVENTION

The present invention relates to sensors capable of measuring forces along three translational axes and measuring moments about each of these three axes. More particularly, the present invention relates to force sensors having three or four legs, each of which contain two shear strain gages oriented to sense forces in directions orthogonal to one another.

For many applications, it is important to accurately and dynamically determine forces acting on a body such as a machine tool at the end of a robotic arm. The magnitude and direction of such forces may be described in terms of three mutually orthogonal axes (e.g., the conventional X, Y, and Z Cartesian coordinates) and the moments about each of these axes. Various force sensors are employed for such tasks. One widely-used type of force sensor is the strain-based force sensor. These sensors generally include a body that deforms under applied forces and moments, and some transducer that is sensitive to the strain in the body. The transducer, often a strain gage (foil or semiconductor), is placed on the body in a location of expected strain. Usually, the strain gage is placed in a location and at an orientation in which one form of strain is dominant - bending, shear, or extensional strain. By measuring the strains in appropriate locations, one can then calculate the forces and moments applied to the body.

Many strain-based force sensors are known in the art. However, the available sensors suffer from various shortcomings. For example, many force sensors measure "bending strain" which requires a relatively large deformation in order to generate a sufficiently large output (in comparison to the amount of deformation required to generate the same output in a shear or elongation detecting sensor). The bending referred to here is a deformation of a beam or arm that is initially planar and bends so that it is no longer planar. To generate a sufficiently large bending strain, the arm on which a strain gage is mounted must be relatively flexible. Unfortunately, this can result in signal degradation by lowering the natural frequency of the sensor, limiting frequency response, and causing vibrations in the overall system. Further, the relatively large displacements required for bending strain measurements can take the sensor out of a linear response regime (i.e., the strain of the body is no longer directly proportional to the applied force), thus complicating interpretation of strain gage interpretation of strain gage outputs. Still further, if the sensor arms are made too thin, the entire sensor may fail prematurely when relatively large forces are applied.

Another issue arises with force sensors which have multiple strain gages mounted on the same arm. Often the strain gages provided on such sensors require different levels of sensitivity. Unfortunately, the sensitivity to forces in one direction is often coupled to the sensitivity of forces in an orthogonal direction. Thus, it may be impossible to increase the sensitivity of one strain gage mounted on a sensor arm without also increasing the sensitivity of another strain gage mounted on the same arm. This can be understood by considering one method for increasing sensitivity: decreasing the thickness of the arm on which the strain gages are mounted to produce a more flexible arm. Consider, for example, U.S. Pat. 4,094,192 which uses beams that have shear strain gages to measure forces acting perpendicular to the sensor axis, and extensional gages to measure forces along the sensor axis. To increase the sensitivity of the extensional gages to bending forces, the cross sectional area of the beam can be reduced. However, this reduction in area will also affect the strain measured by the shear gages. Thus, the sensor can not be engineered so that axial force sensitivity can be adjusted independently of the lateral force sensitivity.

Another problem associated with many strain gages is the potentially large amount of effort and expense associated with their manufacture. In some designs, the sensor body takes on complicated and difficult to machine shapes such as combinations of beams extending radially from cylindrical shells. In addition, some designs require multiple strain gages placed at various hard to reach locations on the sensor body. For example, some force sensors have strain gages mounted on both the inside and outside surfaces of hollow cylindrical sensor bodies. See e.g., U.S. Pat. Nos. 4,640,138 and 4,823,618. The inside surfaces of such bodies can be especially difficult to reach. Furthermore, some designs require many gages to be placed within a small area (see U.S. Pat. No. 4,911,024). Accurate placement of the strain gages in such sensors must often be done manually - a time consuming and expensive task.

Thus, there exists a need for improved force sensors which are relatively easy to manufacture, do not rely on bending strain, and have decoupled sensitivity to forces in orthogonal directions.

SUMMARY OF THE INVENTION

The present invention provides force sensors in which strain is measured exclusively by shear strain gages mounted on substantially L or T-shaped legs of a sensor body. Preferably, the sensor body is a hollow cylindrical shell. Each L or T-shaped leg of the sensor body has at least two arms which are generally orthogonal to one another. That is, the arms of an L or T-shaped leg have their own associated directions and those directions are oriented at approximately 90° with respect to one another. Generally, the "directions" of each arm will be along a lengthwise or longitudinal axis, but this need not be the case if the arms are particularly short.

As used herein, the terms "L or T-shaped" refer very generally to the relative arrangement of members or arms that make up the leg. These arms are generally perpendicular to one another, but need not be exactly perpendicular. Further, the arms can have variable relative lengths so that the aspect ratio of the arms in the L or T can vary widely. Still further, the L or T-shaped leg can assume different orientations (over 360°) with respect to the sensor body.

Each of the two orthogonal arms of an L or T-shaped leg has a shear strain gage mounted thereon in an orientation such that it responds primarily to force components directed perpendicular to the direction of the arm on which it is mounted. In preferred embodiments, the sensor legs are provided with open sections (e.g., pockets or channels) sized to hold the strain gages (which are mounted therein) and to provide good sensitivity. In further preferred embodiments, the outputs from the shear strain gages on the sensor body are sent to a digital processor which determines the magnitude and direction of any force/moment applied to the sensor body from, for instance, a robot arm.

As mentioned, sensor arms which respond to bending strain must be relatively flexible in order to provide sufficient sensitivity to applied forces. By employing only shear strain gages, the present invention avoids the various difficulties associated with measuring bending strain. Further, by mounting the strain gages against open section floors, the force sensors of this invention provide good sensitivity without sacrificing the strength of the arms. This is because the strain gages are mounted on the open section floors which are more sensitive to shear forces than thicker, stronger regions of the arms which surround the open sections. And because the open section depths can be tailored for each strain gage, the sensitivity of the strain gages to forces in the orthogonal directions can be decoupled. In other words, the sensitivity of each strain gage can be independently adjusted such that it does not effect the sensitivity of other strain gages of the sensor.

One specific aspect of the present invention provides a force sensor for measuring forces on a sensor body in at least two dimensions. This force sensor can be defined in terms of the following elements: (1) an L-shaped leg integrated in the sensor body and having a first arm and a second arm each of which has a direction which is substantially perpendicular to the direction of the other arm (each arm also has a generally planar surface); (2) a first shear strain gage mounted on the first arm of the L-shaped member such that the first strain gage responds to primarily shear forces which are both parallel to the plane of the first arm and perpendicular to the direction of the first arm; and (3) a second shear strain gage mounted to the second arm of the L-shaped member such that the second strain gage responds to primarily shear forces which are both parallel to the plane of the second arm and perpendicular to the direction of the second arm. Preferably, a plurality of such L-shaped legs are integrated in a hollow generally cylindrical force sensor body.

In accordance with this invention, the strain gages are preferably mounted in open sections provided within the arms of the L-shaped legs. These open sections may be pockets, channels, I-beams, etc. which have generally U-shaped cross-sections. Typically, the shear strain gages will be mounted within the open section. In alternative embodiments, however, the strain gages are mounted on the L-shaped legs, but on the sides of the legs that are opposite the side of the open section. In other words, the strain gages are mounted on the "backsides" of the open sections.

Another aspect of the present invention provides a method of sensing forces on a generally cylindrical and hollow force sensor having axial and transverse axes and having three or more legs each of which has at least a first shear strain gage oriented to detect force components primarily in the axial direction and a second shear strain gage oriented to detect force components primarily along a transverse axis. This method of sensing forces can be defined in terms of the following steps: (1) monitoring shear strain detected by the first strain gages and caused primarily by forces acting in the axial direction and/or moments about one of the transverse axes; (2) monitoring shear strain detected by the second strain gages and caused primarily by forces acting in one or more of the transverse directions and/or moments about the axial axis; and (3) processing the shear strains detected by the first and second strain gages to determine the magnitude and direction of any forces and/or moments applied to the force sensor. In accordance with one focus of the invention, the steps of monitoring shear strain detect shear strain occurring in open sections in which the strain gages are mounted. Further, the step of processing preferably is conducted by a digital processor located within the hollow interior of the cylindrical force sensor.

These and other features of the present invention will be described in more detail in the following specification of the invention and the associated figures.

DESCRIPTION OF THE PREFERRED EMBODIMENTS

The present invention employs shear strain gages in specific arrangements on sensor bodies to provide force sensors which can sense forces/moments acting in up to three translational and three rotational directions. Shear strain gages (as well as other types of strain gages) measure strain (local, small deformations of a body measured per unit length of the body). Based upon known relationships between stress and strain, and upon calibration, the measured strain can be converted to the forces applied on a body. The strains experienced by a gage cause their electrical resistance to change, which can then be measured by, for example, a Wheatstone bridge. Force sensors can determine the direction of an applied force/moment by comparing and processing the outputs from multiple strain gages mounted at known sensor body locations chosen to respond primarily to force components acting in particular directions.

Generally, force sensors must be calibrated in order to obtain the proportionality constants between the applied force and strain of each strain gage mounted on the sensor body. Most available strain gages are constructed of either foil or semiconductor elements. Either of these are suitable for use with the present invention, and suitable foil strain gages are available from Measurements Group, Inc. of Raleigh, N.C.

Figure 1:
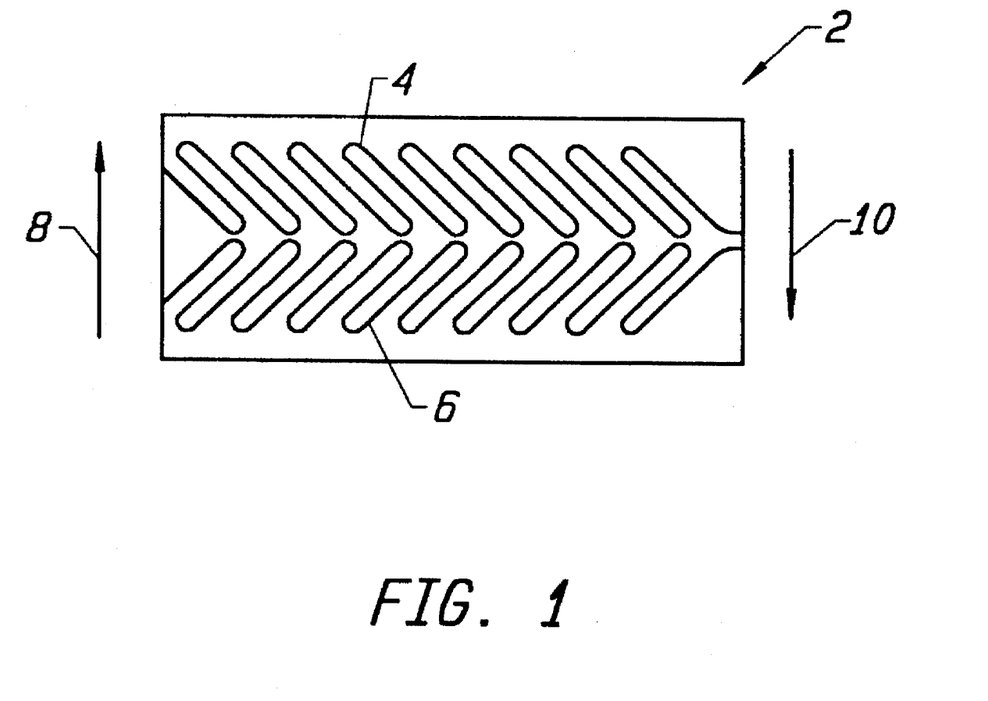
FIG. 1 is an illustration of a foil-type shear strain gage suitable for use with the present invention.

Although the particular design of a shear strain gage is not critical to the present invention, a general understanding how shear strain gages operate will aid in understanding the invention. Thus, the following discussion of a typical shear strain gage 2 is provided with reference to FIG. 1. Strain gage elements 4 and 6 measure strains along their axes only. To measure shear strain in a body, the two gage elements 4 and 6 are aligned with their axes along the two principal (axial) strain directions associated with the shear strain, i.e., the elements are inclined at 45 degrees with the direction of the shear force (illustrated by arrows 8 and 10). The combination of two gage elements inclined at 45 degrees to the shear force direction is generally known as a shear strain gage. Typically, each element of the strain gage occupies an arm of a Wheatstone bridge which measures small changes in resistance, and hence applied strains and forces. Although the shear strain gage shown in FIG. 1 includes two gage elements on a single backing as is common in "foil" shear strain gages, the "shear strain gages" of this invention include any two gage elements in close proximity and aligned with respect to one another as described above. For example, two semiconductor strain gages aligned with their axes along the two principal strain directions would constitute a "shear strain gage" within the scope of this invention.

Figure 2A:
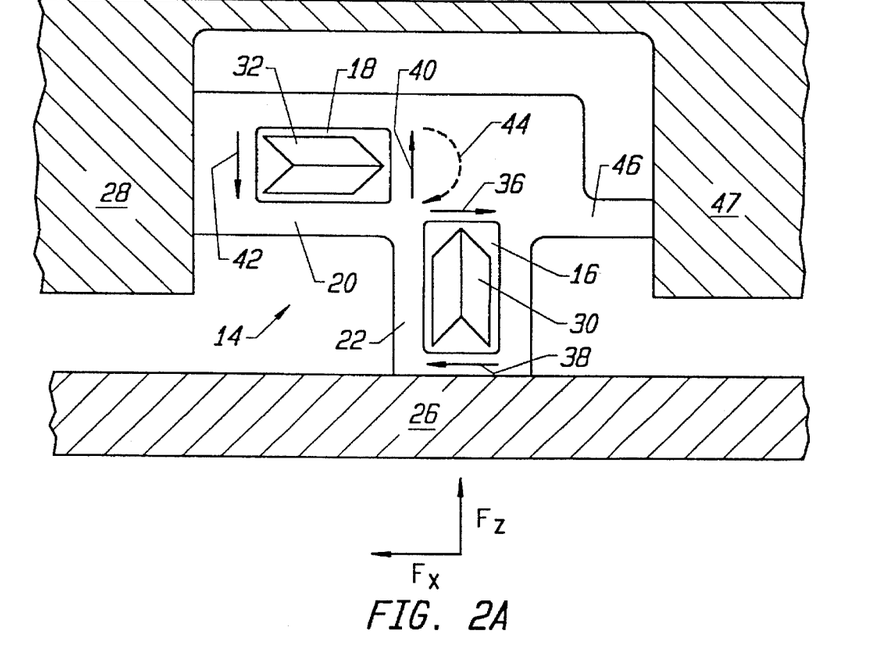
FIG. 2a is a side elevational view of an L-shaped leg containing vertically and horizontally oriented shear strain gages in accordance with the present invention.

FIG. 2a illustrates how the present invention employs an L-shaped leg or member 14 to measure forces. As will be explained in more detail below, a typical force sensor of this invention includes three or four such L-shaped legs integrated in a hollow, preferably cylindrical, sensor body. Generally, L-shaped leg 14 will be part of a larger structure (the sensor body) including support regions 26, 28, and 47. Support regions 28 and 47 form part of a single structure which is typically attached to a reference body. Support region 26 forms part of a different structure attached to a different body. Leg 14 detects forces acting between the two bodies. L-shaped leg 14 includes two arms: a horizontal arm 20 connected to support 28 and a vertical arm 22 connected to support 26. Horizontal arm 20 includes a mounting region 18 in which a shear strain gage 32 is mounted. Likewise, vertical arm 22 includes a mounting region 16 in which a shear strain gage 30 is mounted. It should be noted that the terms "horizontal" and "vertical" as used herein are for sake of illustration only. In fact, L-shaped member 14 may be aligned in various orientations such that arm 20 would not be characterized as horizontal and arm 22 would not be characterized as vertical. Further, the relative lengths of arms 20 and 22 and the angle therebetween can deviate somewhat from the embodiment shown in FIG. 2a (and 2b). Generally, however, arm 20 will generally be substantially perpendicular with arm 22.

Figure 2B:
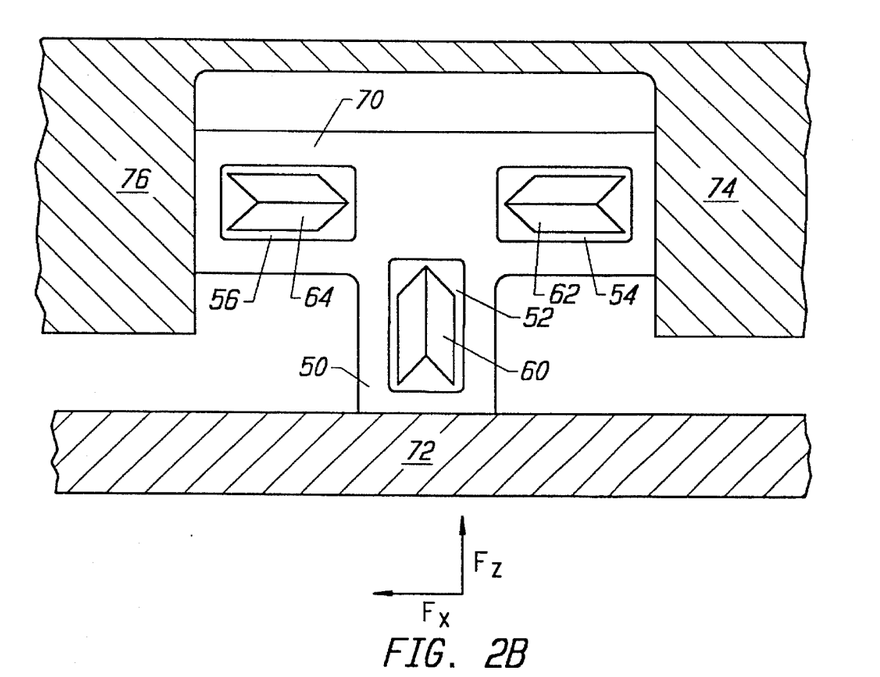
FIG. 2b is a side view of a T-shaped leg having two horizontally oriented strain gages and one vertically oriented strain gage, also in accordance with the present invention.

For purposes of the ensuing discussion of FIGS. 2a and 2b, the following coordinates will be employed: the Z axis will be in the vertical direction of the page, the X axis will be in the horizontal direction of the page, and the Y axis will be in the direction normal to the plane of the page. If a force $F_z$ acts on L-shaped leg 14 (through region 26) as shown, it will be opposed by rigid support 28 to generate opposing local forces 40 and 42. These forces will cause mounting region 18 to be loaded in shear. In response, shear strain gage 32 will produce a relatively large output signal. It should be noted that if Fz was applied to L-shaped leg 14 in a direction opposite that shown (i.e., upward), region 18 will again be loaded in shear, but the directions of local forces 40 and 42 will be reversed and the sign of the output signal from strain gage 32 will likewise be reversed.

Forces in the Z direction compress or extend mounting region 16, leading to a relatively small output from shear strain gage 30. Thus, a force acting on leg 14 in the Z direction is characterized by relatively large output from shear strain gage 32 and a relatively small output from strain gage 30.

A force applied in the X direction, $F_x$, will have the opposite effect. Specifically, a force $F_x$ acting on L-shaped leg 14 as shown at rigid support 26 will be opposed by rigid support 28 to produce coupled local forces 36 and 38. These forces load mounting regions 16 in shear and cause strain gage 30 to produce a relatively large output. However, the same force will compress region 18 (or extend region 18 if Fx is in the opposite direction), leading to a relatively low output from strain gage 32. Thus, a force applied to L-shaped leg 14 in the X direction will lead a relatively large output from shear strain gage 30 and a relatively small output from shear strain gage 32.

An optional bridge or runner 46 is provided between L-shaped leg 14 and support 47 in order to support bending forces applied to horizontal arm 20 by, for example, forces in the Z direction. Thus, bridge 46 may reduce the sensitivity but enhances the strength of L-shaped leg 14 and the structure to which is affixed. In alternative embodiments of the invention, bridge 46 is not employed.

In preferred embodiments, mounting regions 16 and 18 are pockets provided within arms 22 and 20. The main structure of L-shaped leg 14 will have a thickness sufficiently great to resist failure from excess loading and deformation. However, to make strain gages 30 and 32 more sensitive to applied stress, mounting regions 16 and 18 are preferably pockets having pocket floors in which strain gages 30 and 32 are mounted. Specifically, the thickness of arms 20 and 22 is not as great in regions 18 and 16 as it is throughout the remainder of L-shaped leg 14. Thus, regions 16 and 18 experience greater amounts of strain in response to an applied stress. Hence, the pockets increase the sensitivity of a force sensor without significantly sacrificing the strength of its surrounding structure. In this case, that is the strength of L-shaped leg 14 and the structure in which it is incorporated.

It should be noted that the described pockets give arms 20 and 22 a structure that generally that can be characterized as an "open section." Suitable equivalent structures include channels, I beam structures, etc. As is known to mechanical engineers in this field, such structures provide generally uniform shear profiles over the width of their floors in response to an applied force. Thus, shear strain gages mounted in open sections generally measure shear strain having less local variation than do shear strain gages mounted in other structures. This allows for more consistent force/moment readings in response to various forces. It should be noted that it is equally advantageous to mount shear gages on the front or back sides of open section floors. The shear profile will be equally uniform on either side of the floor.

FIG. 2b illustrates an alternative embodiment of the present invention. A Tshaped leg 48 is rigidly affixed to supports 72, 74, and 76. Specifically, a horizontal cross arm 70 is affixed to support 74 and 76 while a vertical arm 50 is affixed to support 72. Horizontal cross arm 70 includes two mounting regions 54 and 56 which preferably take the form of pockets as described above. Within these pockets, shear strain gages 62 and 64 are mounted. These gages respond to forces in the Z direction as described above in connection with FIG. 2a. Arm 50 includes mounting region 52 -also preferably a pocket - in which shear strain gage 60 is mounted. Forces in the X direction will cause relatively large outputs from strain gage 60 as described above. In general, a force applied in the Z direction will produce relatively large outputs from strain gages 62 and 64, with relatively little output from strain gage 60. In contrast, forces in the X direction will produce relatively large outputs from strain gage 60 and relatively small outputs from strain gages 62 and 64. While the embodiments shown in FIG. 2b has a disadvantage of requiring additional costs associated with additional strain gage and additional manufacturing steps, it has the advantages of (1) providing data from an additional strain gage, and (2) providing additional strength to the force sensor. It should be noted that the T-shaped leg need only have two strain gages arranged to detect strain in orthogonal directions.

Figure 3:
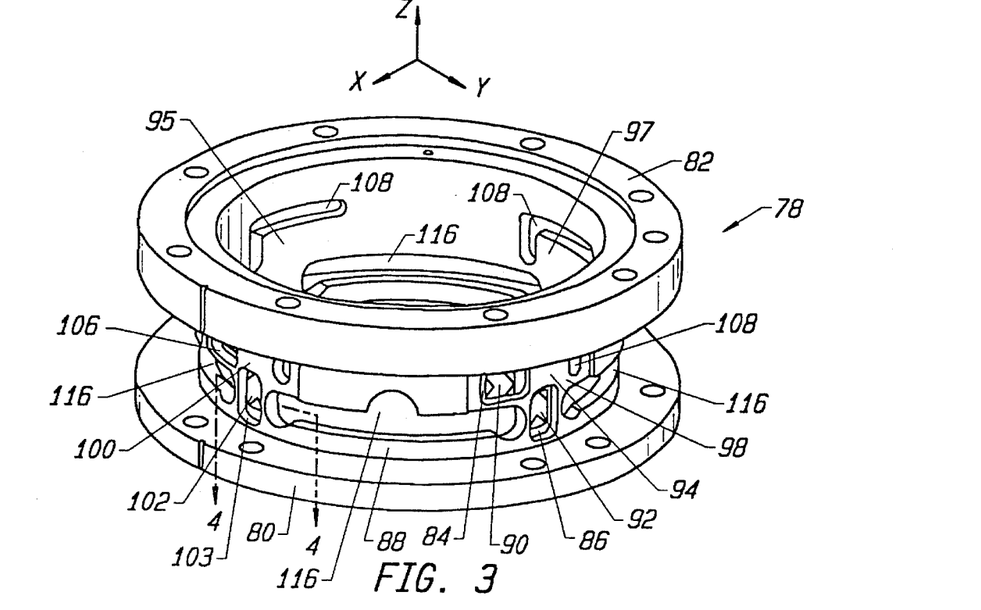
FIG. 3 is a perspective view of a generally cylindrical force sensor having four L-shaped legs in accordance with a preferred embodiment of this invention.

FIG. 3 is a perspective view of a preferred force sensor 78 of this invention. Force sensor 78 is a generally cylindrical (and hollow) body including flanges 80 and 82 which are mounted to other elements (not shown) such as components of a robot arm. Throughout the following discussion it will be assumed that lower flange 80 is mounted to a reference structure, while upper flange 82 is mounted to a source of applied forces such as a robotic arm which might include a "hand" for assembling items or a machine tool for grinding or deburring. See for example FIG. 12 discussed below.

Four L-shaped legs as described in connection with 2a above are provided on a generally cylindrical surface 88 between flanges 80 and 82. These L-shaped members are defined by four equally spaced long apertures 116, and by four other equally spaced L-shaped apertures 108. Two L-shaped legs 94 and 100 are shown on surface 88 separated from one another by approximately 90°. The other two L-shaped legs 95 and 97, shown from their inner side, are also separated from adjacent members by 90°. In the coordinate system shown in FIG. 3, L-shaped members 94 and 95 lie on the Y axis and L-shaped members 100 and 97 lie on the X axis. The L-shaped legs are generally planar, but have some curvature associated with the angle they subtend in cylindrical surface 88.

L-shaped leg 94 includes a vertical pocket 86 in which a shear strain gage 92 is mounted and a horizontal pocket 84 in which a shear strain gage 90 is mounted. Likewise, L-shaped leg 100 includes a vertical pocket 103 in which a shear strain gage 102 is mounted and horizontal pocket in which a shear strain gage 106 is mounted. As will be explained below, this arrangement of four L-shaped members disposed about a cylindrical surface 88 and separated from one another in increments of 90° allows accurate measurement of forces and moments along six axes: the X, Y, and Z translational axes, and moments about each of these axes.

Strain gages 102 and 92 mounted in vertical pockets 103 and 86 (and their counterpart strain gages mounted in the other vertical pockets of legs 95 and 97) respond primarily to forces in directions transverse to sensor body 88 (i.e., forces in the X and Y directions). It should be noted that such forces may be generated by moments about the Z-axis. The response of these strain gages to forces in the transverse directions and moments about the Z-axis results because such forces will load pockets 103 and 86 (as well as their two counterpart vertical pockets - not shown) in shear. These same transverse forces will have relatively little effect on shear strain gages mounted in the horizontal pockets including pockets 106 and 86. This is because these pockets will experience primarily bending and tension (as opposed to shear) strain. However, the strain gages mounted in the horizontal pockets will produce a relatively large output in response to forces along the axis of sensor body 88 (i.e., forces in the Z-direction). It should be noted that moments about the X and Y axes will cause some of these same strain gages to produce relatively large outputs. As described below, the relative outputs of the various strain gages in force sensor 78 can unambiguously establish the magnitude and direction of applied forces.

Figure 4:
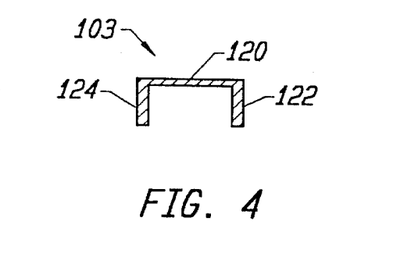
FIG. 4 is a cross-sectional view of a pocket for mounting a strain gage in a force sensor of this invention.

FIG. 4 is a sectional view of vertical pocket 103 taken along line A—A'. The pocket includes a thin pocket floor 120 in which shear strain gage 103 is mounted. As can be seen, the U-shaped cross-section is relatively thin in the direction normal to floor 120 in comparison to the direction parallel to floor 120. Thus, the entire cross section of the pocket 103 (including the thick walls) is "thin" compared to the thickness of the legs placed 90 degrees away on the sensor body as seen by forces in the X direction. More precisely, the moment of inertia of 100 is small compared to the moment of inertia of 94 in the X direction (FIG. 3). So, if an X force is applied to the sensor, leg 94 will support much more of the force than leg 100 will. The output of leg 100 will be smaller than leg 94 because of this. Further, the amount of X force supported by leg 100 will bend leg 100, not put it in shear. The strain gages are mounted in leg 100 such that they are relatively insensitive to strains caused by bending.

Figure 5:
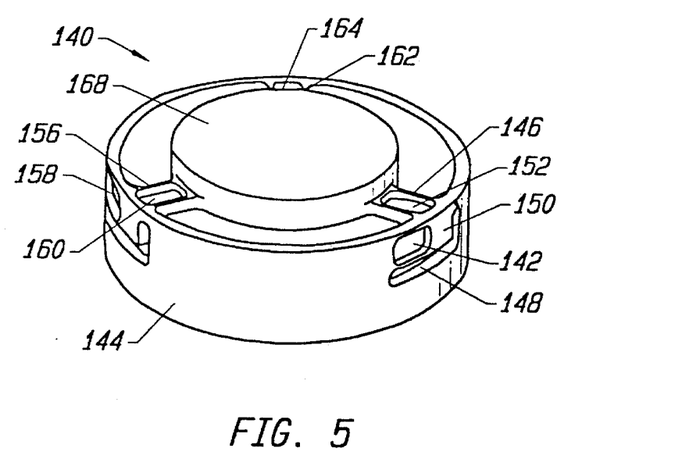
FIG. 5 is a perspective view of a force sensor having three legs in accordance with an alternative embodiment of this invention.

FIG. 5 is a perspective view of an alternative embodiment of the present invention. In this embodiment, force sensor 140 includes only three L-shaped legs, each of which includes two shear strain gages. As shown, L-shaped apertures 148 and two counter parts define arm 150 and two counterparts. Unlike the L-shaped legs described in connection with the embodiment of FIG. 3, the L-shaped leg in this embodiment have arms and strain gages which are not coplanar. For example, one Lshaped leg includes perpendicular arms 146 and 150. Arm 146 includes a pocket 152 in which a shear strain gage is mounted. Counterpart legs 162 and 156 include pockets 164 and 160 respectively. These three legs, 146, 156, and 164, are attached to a central support member 168. This arrangement allows shear strain gages in pockets 152, 160, and 164 to respond primarily to forces in directions transverse to a hollow cylindrical body 144. Pockets 142, 158, and a counterpart of pocket 164 (not show) in leg 162, are provided in sensor body 144. Each of these pockets includes a shear strain gage which responds primarily to forces along the axial direction of cylindrical sensor body 144. Of course, the shear strain gages in pockets 152, 160, and 164 will respond to forces in the X–Y plane to differing degrees depending upon the actual direction of the force. Further, these strain gages will respond equally to moments about the Z axis. Strain gages in pockets 142 and 158 together with their mate, not shown, will response equally to forces in the Z direction. They will also respond to moments about the X and Y axes to varying degrees depending upon the actual moment axis.

Figure 6:
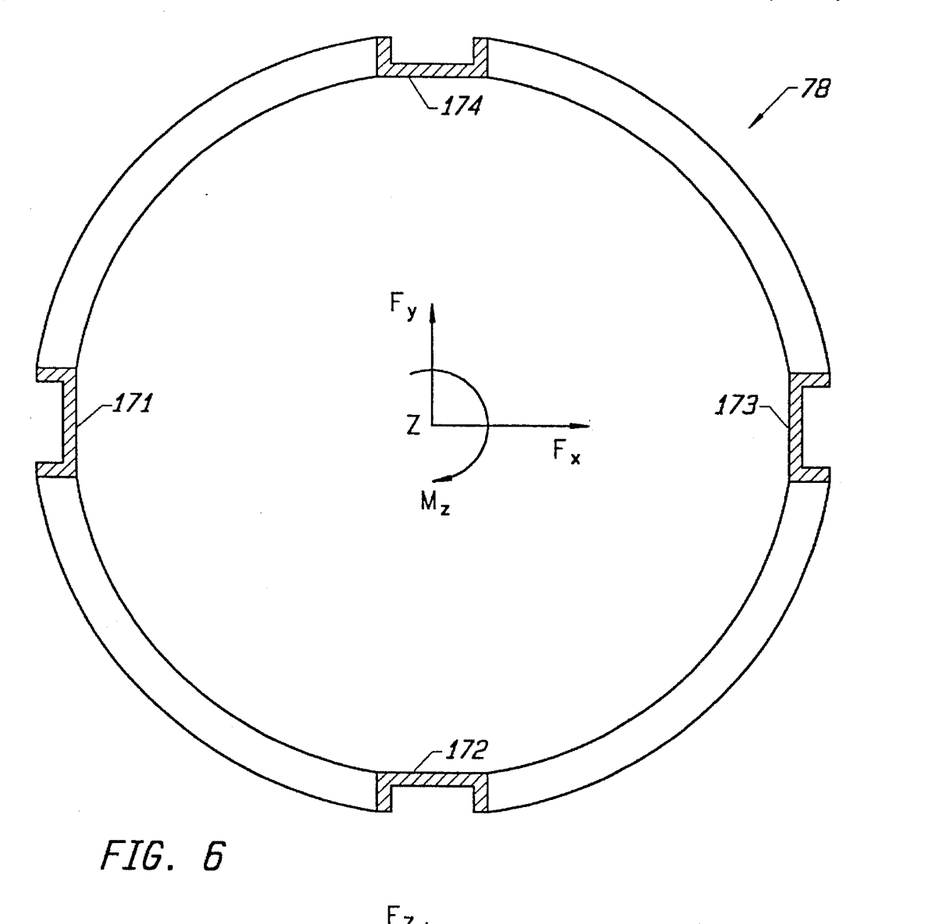
FIG. 6 is a plan view of a force sensor depicting how vertically oriented strain gages respond to various forces and moments.

FIG. 6 is a cut away top view of force sensor 78 shown in FIGS. 3–4. This figure in conjunction with FIG. 7 will be used to illustrate how force sensor 78 distinguishes between forces along the six axes. C-shaped regions 171, 172, 173, and 174 are cross-sections of the four vertical pockets of force sensor 78. In response to a force in the X direction, $F_x$, pockets 17 1 and 173 will provide little support and experience primarily bending. Such bending will cause the floors of pockets 103 to extend. This form of strain will provide a relatively small output signal from the shear strain gages mounted in pockets 171 and 173. This can be understood with reference to FIG. 2a, where the bending force experienced by pockets 171 and 173 is equivalent to a force in the Y direction experienced by pocket 16. Such force provides a only extension in pocket 16 and therefore a relatively small output signal from shear strain gage 30.

A force in the X direction will be supported primarily by pockets 172 and 174, both of which will be loaded in shear. Thus, the shear strain gages mounted in pockets 172 and 174 will provide relatively large output signals in response to forces in the X direction. This may be understood again with reference to FIG. 2a, where it is seen that a force Fx loads pocket 16 in shear. Under such force, shear strain gage 30 will provide a relatively large output signal. In view of the above discussion, a force in the X direction will provide relatively large output signals from shear strain gages in pockets 172 and 174 and relatively small outputs signals from the shear strain gages in pockets 171 and 173. In practice, an applied force will often have both X and Y components. The relative size of the signals provided by strain gages in pockets 171–174 will determine the actual direction of the applied force.

A force in the Y direction will have the opposite effect. In this case, pockets 172 and 174 will experience primarily bending which results in relatively small output signals from the shear strain gages mounted therein. However, the shear strain gages mounted in pockets 171 and 173 will be loaded in shear and provide relatively large output signals.

A moment about the Z axis will load each of the pockets 171–174 in shear and provide relatively large output signals in all four vertically mounted shear strain gages. Thus, relatively large outputs from each of the vertically oriented strain gages indicates that the applied force/moment includes a moment about the Z axis. As will be explained below, the vertically oriented strain gages provide relatively small outputs in response to forces in the Z direction and moments above the X and Y axes.

It should also be noted that forces in the X and Y direction and moments about the Z axis all provide relatively small shear strains in the horizontal pockets. This can be understood with reference to FIG. 2a where a force $F_x$ or a force in the Y direction is applied to horizontal pocket 18.

Figure 7:
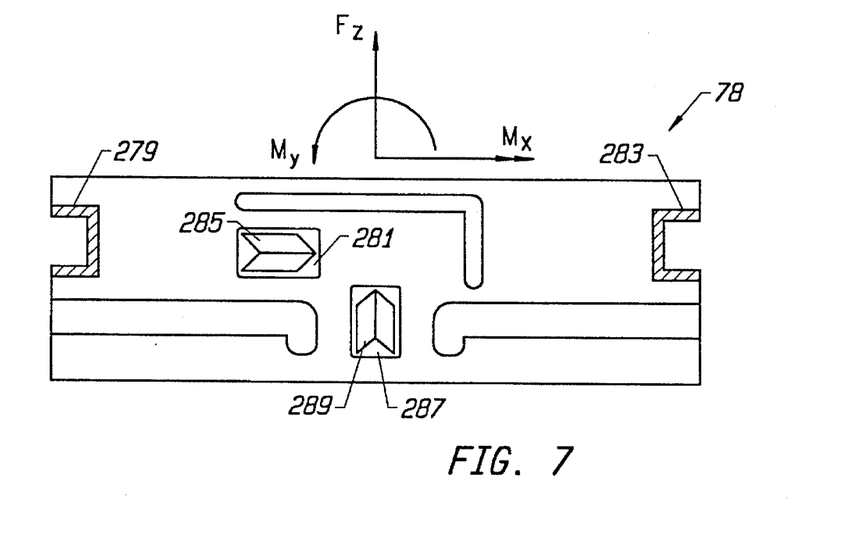
FIG. 7 is an elevational view illustrating how horizontally oriented strain gages respond to various forces and moments.

FIG. 7 illustrates how the shear strain gages mounted in the horizontal pockets of force sensor 78 respond to forces in the Z direction and moments about the X and Y axes. As explained with reference to FIG. 2a, a force in the Z will load the horizontal pocket 18 in shear providing a relatively large output signal from shear strain gage 32. Likewise, horizontal pockets 279, 281, and 283 shown in FIG. 7, together with the other horizontal pocket (not shown) will all be loaded in shear and generate relatively large outputs signals. Thus, forces in the Z direction are characterized by relatively large output signals from each of the four horizontal shear strain gages. As shown with reference to FIG. 2a, strain gage 30 in vertical pocket 16 provides a relatively small output signal in response to forces in the Z direction. Likewise, shear strain gage 289 in vertical pocket 287 will provide a relatively small output signal. The same can be said of the other strain gages mounted in vertical pockets.

A moment about the Y axis will provide very little output from either strain gage 285 or strain gage 289. These strain gages sit rather close to the Y axis and therefore have relatively short moments arms. Thus, for a moment about the Y axis (depicted by arrow 44 in FIG. 2a), pockets 281 and 287 will experience relatively small forces. However, due to their relatively large moment arms, horizontal pockets 279 and 283 will experience relatively large forces which will appear to come from the Z direction, albeit in different directions. Referring again to FIG. 2a, such forces can be expected to generate relatively large output signals from the shear strain gages the horizontal pockets and relatively small output signals from the shear strain gages in the corresponding vertical pockets. Thus, moments in the Y direction are characterized by relatively large output signals (of opposite sign) from the strain gages in the horizontal pockets on the X axis, with relatively small output signals from all remaining shear strain gages.

A similar effect will be observed for moments about the X axis. In this case, only the horizontal shear strain gages on the Y axis will produce relatively large output signals. All other strain gages will produce relatively small output signals. And, as with the moment about the Y axis, the horizontal strain gages producing the relatively large output signals will generate signals having opposite signs.

Figure 8:
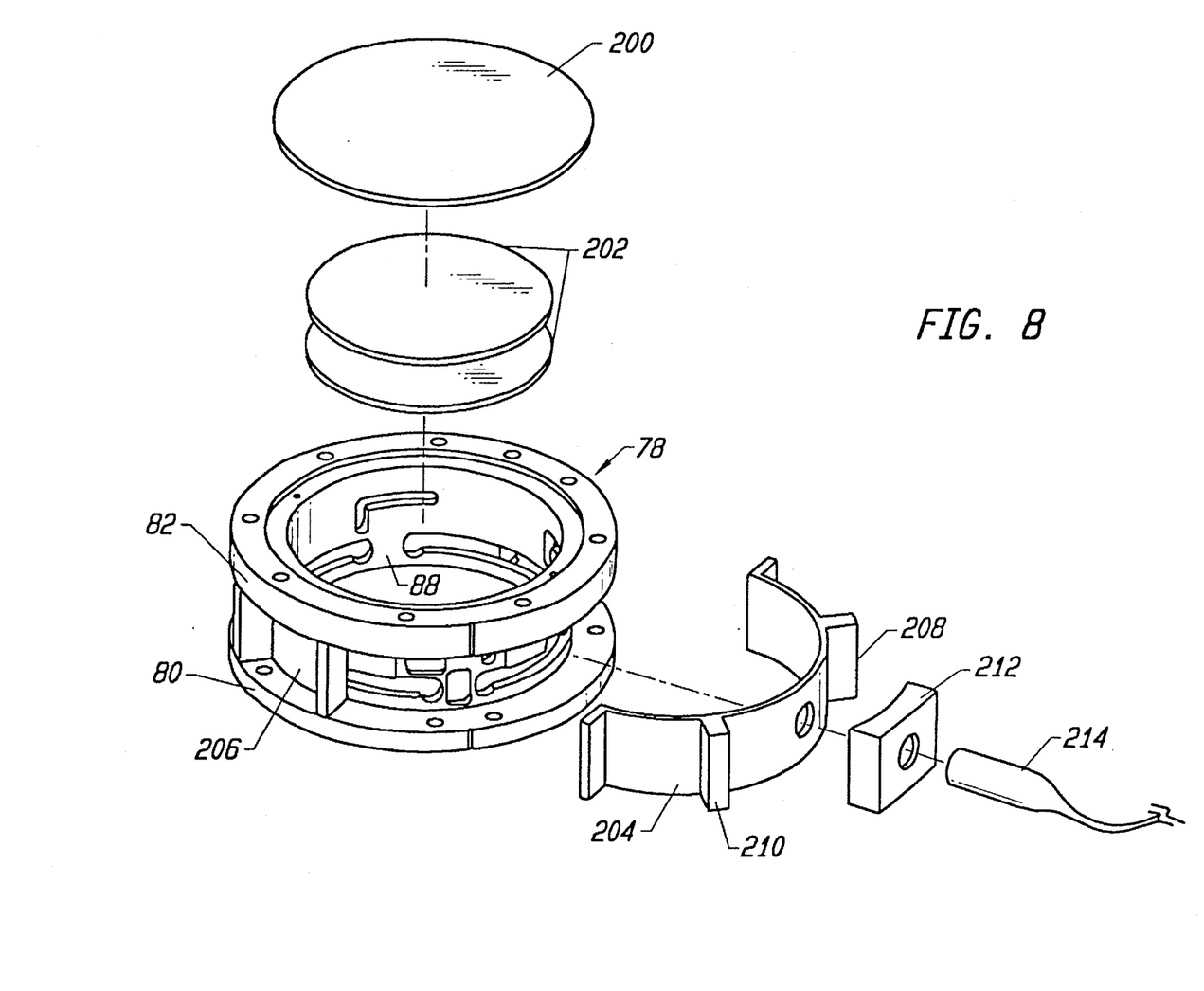
FIG. 8 is an exploded view of the components used in a force sensor in accordance with a preferred embodiment of this invention.

FIG. 8 is an exploded view the force sensor 78 and associated components. Disk shaped printed circuit boards 202 contain the processing electronics for the eight shear strain gages mounted on force sensor 78. The printed circuit boards 202 are sized to fit within cylindrical body 88 for convenient wiring to the strain gages. In one preferred embodiment, the gages are wired directly to the printed circuit boards. In another preferred embodiment, the gages are wired to a first electronic connection part (not shown) that mates with a second electronic connection part (not shown) mounted on a printed circuit board.

A top cover 200 and side covers 204 and 206 protect the sensor and associated electronics from debris and contact with other bodies. The side covers 204 and 206 are sized to fit with precise clearance between to top flange 82 and the bottom flange 80, and include radial extensions 208 and 210 that extend to the periphery of flanges 82 and 80. This design protects the force sensor 78 from possible damage due to over load in the Z direction. In preferred embodiments, the clearance is between about 0.05 mm and 0.5 mm. During normal operation, this clearance between the side covers and flanges allows all forces and moments to be transmitted through the L-shaped members. However, in the event that the sensor is overloaded by an $F_z$ force, or $M_x$ or $M_y$ moment, the side cover extensions 208 and 210 will support flanges 82 and 80, thus protecting the sensor L-shaped members from plastic deformation and failure.

An electronics cable 214 connects the sensor electronic printed circuit boards 202 to the host controller and power supplies (not shown). The cable attaches to a mating part supported by a cable anchor 212, which together with side cover parts 204 and 206, is rigidly attached to the top flange 82 of the sensor 78. This arrangement shields the sensor from motions of the cable that can otherwise introduce error in the force and moment measurements.

Figures 9A, 9B, 9C:
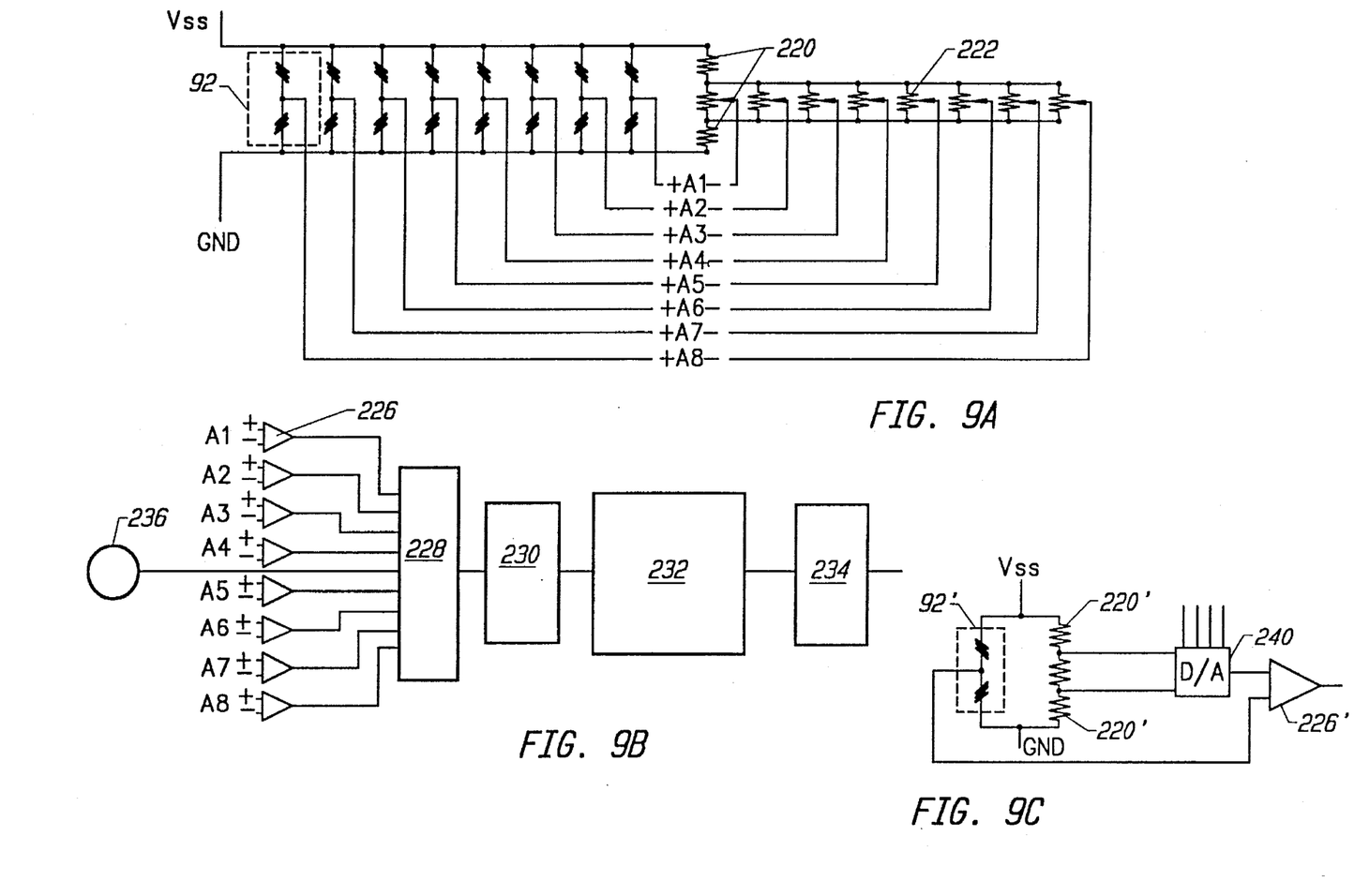
FIGS. 9a and 9b are schematic illustrations of the force sensor electronics in accordance with a preferred embodiment of this invention.
FIG. 9c is a schematic illustration of bridge balancing electronics according to an alternative embodiment of this invention.

FIG. 9a is a schematic drawing of the electronics of printed circuit boards 202, wherein eight sets of shear strain gages are connected to compensating electronics. The output signals from the strain gages are processed using Wheatstone bridges. The shear gages, such as vertical shear strain gage 92, are connected as a half bridges in parallel to two bridge completion resistors 220. Eight potentiometers such as potentiometer 222 are attached in parallel with respect to each other, and then in series with the bridge completion resistors 220. The output of each shear strain gage (e.g., shear strain gage 92) is sent to one terminal of an instrumentation amplifier, while the output of a potentiometer 222 is sent to the other terminal of the instrumentation amplifier.

This circuit has the advantage that only two bridge completion resistors 220 are required for all eight strain gage bridges rather than two bridge completion resistors for each Wheatstone bridge (for a total of 16 resistors) in a standard configuration.

As shown in FIG. 9b, the outputs of the instrumentation amplifiers (e.g., instrumentation amplifier 226) are sent to a multiplexer 228 The instrumentation amplifier outputs are then sequentially digitized by the A/D converter 230. A processor 232 then calibrates the digitized gage output and communicates serially with a host controller that oversees the force sensing application. Depending on the tasks assigned to the processor 232, either raw strain gage output or calibrated forces and moments can be sent to the host controller. A temperature sensor 236 is also mounted on the PCBs provide a temperature signal that may be used by the processor 232 or the host controller to compensate for thermal drift in the sensor output. Alternatively, the temperature sensor can be mounted or the sensor body itself to provide a direct measurement of the sensor body temperature. Preferably, the processor 232 is programmed to implement a wide range of commands, including calibration, error detection, thermal composition, and transformation of forces and moments into different coordinate systems. The processor 232 is preferably a digital processor such as a digital signal processor (DSP), a microprocessor, or a microcontroller.

FIG. 9c shows an alternative embodiment in which the potentiometers in the bridge circuits are replaced by digital to analog converters such as digital to analog converter 240. In this embodiment, the digital to analog converter 240 provides a reference voltage to balance the bridge. The output of D/A converter 240 provides one input to instrumentation amplifier 226'. The other input to instrumentation amplifier 226' is provided by shear strain gage 92'. The output of amplifier 226' is processed as described in the embodiment of FIG. 9a. Bridge completion resistors 220' are also provided as described above. This embodiment has the advantage that the processor can be programmed to balance the bridge circuits under command by the host controller, thus avoiding manual adjustment of the potentiometers, resulting in added reliability and convenience.

The force sensor body employed in the below described experiments was machined from a monolithic block of 2024-T81 aluminum. The upper and lower flanges were 105 mm in diameter and the sensor total height (distance between the top of the upper flange and the bottom of the lower flange) was 39 mm. Shear strain gages were obtained from the Measurements Group Incorporated of Raleigh, N.C. These gages were mounted in 2.25 mm deep vertical pockets and 2.35 mm deep horizontal pockets having a longest side dimension of 11 mm and a shortest side dimension of 7 mm. The thickness of the pocket floors was 0.75 mm for the vertical pockets and 0.65 mm for the horizontal pockets. The strain gages were mounted in the pockets with M-610 epoxy, also from Measurements Group, Inc. Leadwires were soldered to the gages, and the wires were then routed to the interior of the sensor body. A layer of silicone sealant was then applied to the gages and wires.

Figure 10:
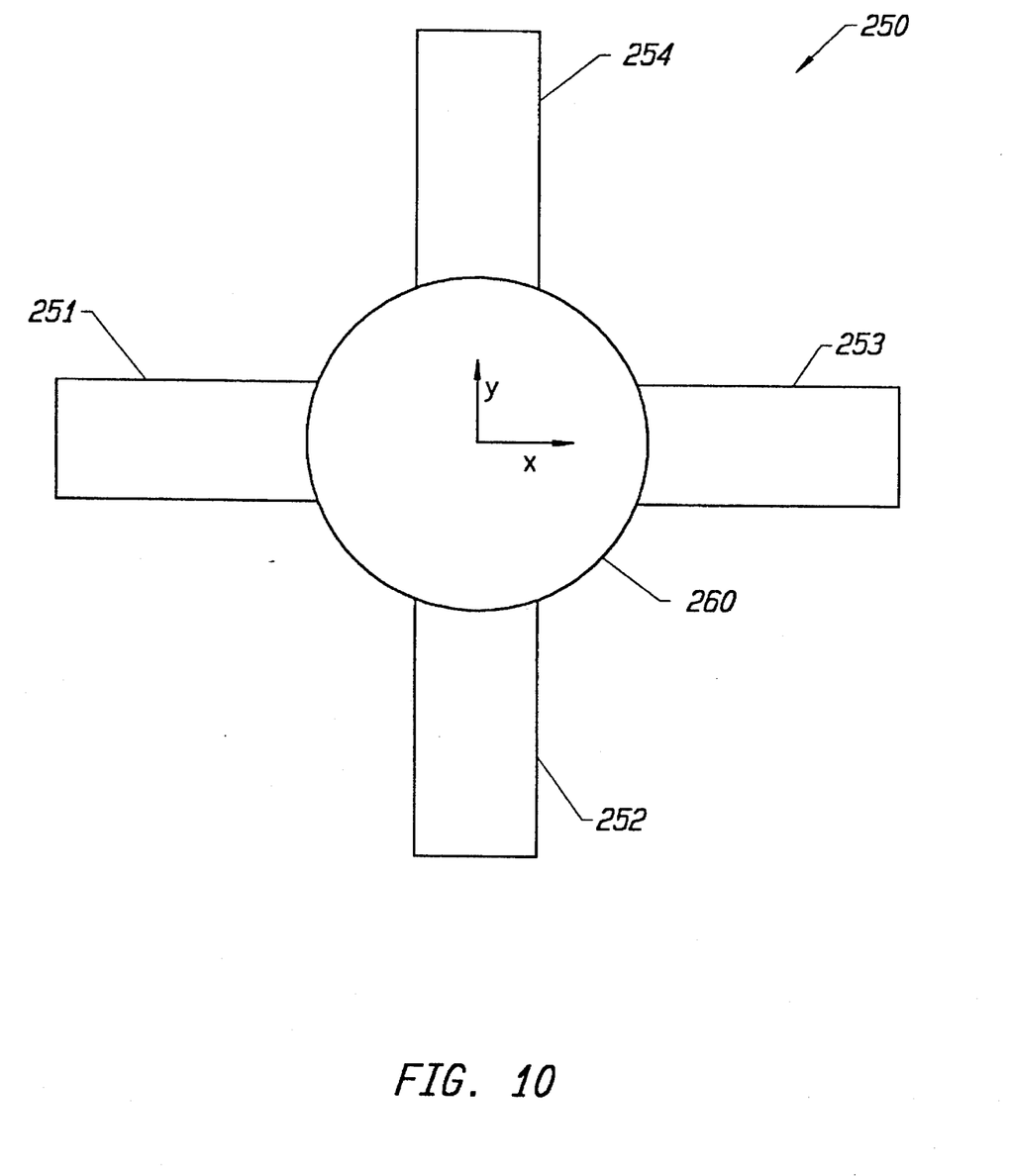
FIG. 10 is a plan view of a testing apparatus employed to calibrate force sensors of the present invention.

The above-described force sensor was tested with a test apparatus (calibration cross) 250 having the structure shown in plan view in FIG. 10. The tests were conducted by attaching the calibration apparatus 250 to the top flange 82 of the force sensor. Various forces of known magnitude and direction were then applied to each of four arms 251, 252, 253, or 254, or to the center of a body piece 260. The outputs of the various strain gages were then measured for the various test forces.

Figure 11:
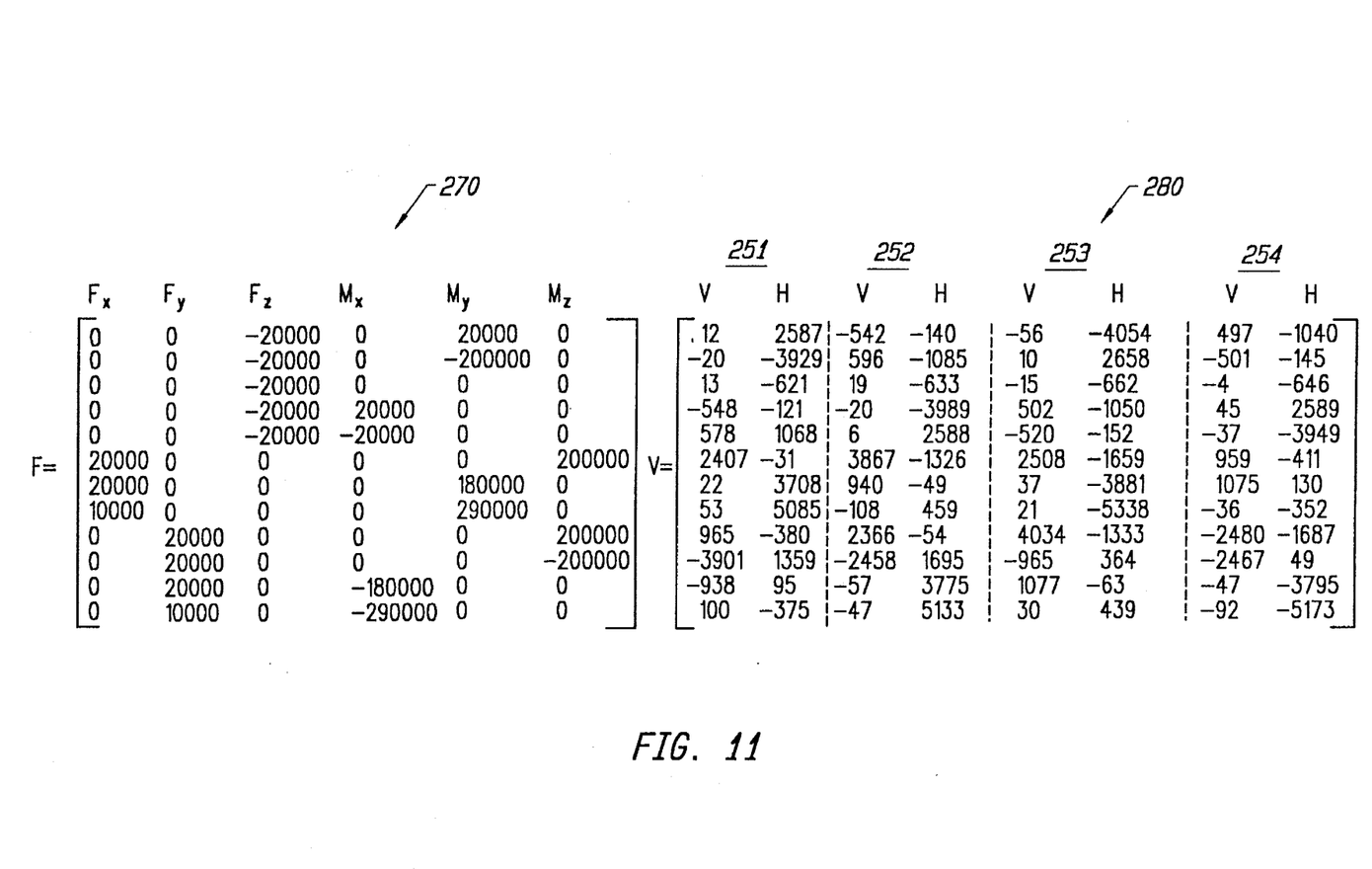
FIG. 11 is an illustration of a force matrix and an associated shear strain gage output matrix for calibration experiments conducted on a force sensor constructed in accordance with this invention.

FIG. 11 shows a force matrix 270 and a corresponding strain gage output matrix 280. The forces and moments applied to the force sensor by test apparatus 250 are shown as rows of the force matrix 270. The outputs of the various strain gages on the force sensor are shown in the corresponding rows of the strain gage output matrix 280. These matrices can be used to generate a calibration matrix which when multiplied with the strain gage output matrix for an unknown applied force will give the actual force.

In the example shown, the first column of force matrix 270 corresponds to the magnitude of a force in the X direction. The second and third columns of force matrix 270 correspond to forces in the Y and Z directions, respectively. The fourth, fifth, and sixth columns of force matrix 270 correspond to moments in the X, Y, and Z directions, respectively.

The first and second columns of strain gage output matrix 280 correspond to the output voltages of the vertically and horizontally oriented strain gages (respectively) mounted on the force sensor leg aligned with calibration arm 251. The third and fourth columns of matrix 280 similarly correspond to the vertically and horizontally oriented strain gages mounted on arm 252. The fifth and sixth, and seventh and eighth columns of matrix 280 likewise correspond to the strain gage outputs for the sensor legs adjacent test apparatus arms 253 and 254 of test apparatus 250.

In the example shown in FIG. 11, the first row of force matrix 270 corresponds to a mass of 20,000 grams applied to arm 253 in a downward direction. This produces a moment $M_y$ about the Y-axis of 200,000 gram-force cm (shown in the fifth column of force matrix 270). This moment is not the only effect experienced by the force sensor, for the moment is coupled with a negative force, $F_z$, in the Z direction. $F_z$ is shown as a -20,000 grams-force entry in the third column of the first row of force matrix 270.

The second row of force matrix 270 shows the forces experienced by the force sensor when a mass of 20,000 grams is applied to arm 251 of test apparatus 250. As can be seen, this also produces a component Fz (shown in the third column of row 2). Further, this produces a moment $M_y$ of a magnitude that is identical that in the previous experiment. However, the sign on $M_y$ changes because the direction of the moment is reversed (following the right-hand rule) when the downward force is moved from arm 253 to arm 251.

The third row of force matrix 270 shows the magnitude of an uncoupled force $F_z$ of 20,000 grams-force in the negative Z-direction when a force of this magnitude is applied to the center of body 260 of test apparatus 250. As explained above, a force in the Z-direction should cause the horizontal shear strain gages of the force sensor to generate relatively large outputs and the vertical shear strain gages to generate relatively small outputs. As can be seen in the third row of output matrix 280, the horizontally oriented shear strain gages gave relatively large outputs in comparison to the vertically oriented strain gages. In other words, the outputs shown in the second, fourth, sixth and eighth columns are uniformly greater than the outputs shown in the first, third, fifth, and seventh columns of matrix 280.

The results of the experiment depicted in the third rows of matrices 270 and 280 are particularly easy to interpret because the applied force is uncoupled. The other rows of the matrices represent experiments in which there are two coupled forces. Thus, the effects of one coupled force may partially offset those of the other coupled force, making for a more complex interpretation of the strain gage output matrix results. However, by employing the eight strain gages oriented as required by this invention (in conjunction with a calibration matrix), the outputs provide enough information to unambiguously identify the applied force. Those of skill in the art will understand how the other rows of force matrix 270, are generated and why they produce the results shown in output matrix 280.

By applying known forces and moments to the sensor (by a calibration cross for example), and recording the responses of the gages, a calibration matrix can be determined for the sensor. Once the calibration matrix is found, any force or moment applied to the sensor can be measured. In fact, the calibration matrix and processing necessary to convert strain gage outputs to forces can be provided by a digital processor or in the sensor itself. Forces and moments can be applied to the sensor in a manner similar to that described in U.S. Pat. No. 4,094,192 which is incorporated herein by reference for all purposes.

In preferred embodiments, a least squares method is employed to calibrate the sensor. This method produces the best results in the sense that it minimizes calibration errors due to variations in calibration measurements. This method can be understood as described below for a sensor having 8 bridge outputs which may be quarter, half, or full bridges). A calibration cross is attached to the sensor as described above.

If the voltage output of the strain gages is denoted v 1, v2, .. v8, a calibration matrix C is given by Cv=F, where $$C = \begin{bmatrix} c_{11} & c_{12} & \cdots & c_{18} \\ & & & \\ c_{21} & & & \\ & & & \\ & & & \\ & & & \\ c_{61} & \cdots & & c_{68} \end{bmatrix} \quad v = \begin{bmatrix} v_1 \\ v_2 \\ \cdot \\ \cdot \\ \cdot \\ v_8 \end{bmatrix} \quad F = \begin{bmatrix} F_x \\ F_y \\ F_z \\ M_x \\ M_y \\ M_z \end{bmatrix}$$

If a known $F_x$ is applied to the sensor, then, although C is unknown the following is expression is true:

$$F_x = [c_{11} \ldots c_{18}] \begin{bmatrix} v_1 \\ \cdot \\ \cdot \\ \cdot \\ v_8 \end{bmatrix} = [v_1 \ldots v_8] \begin{bmatrix} c_{11} \\ \cdot \\ \cdot \\ \cdot \\ c_{18} \end{bmatrix}$$

If multiple measurements 1 . . . m of $F_x$ are taken, the measurements can be arranged in matrix form as $$\begin{bmatrix} F_{x1} \\ \cdot \\ \cdot \\ \cdot \\ F_{xm} \end{bmatrix} = \begin{bmatrix} v_{11} & \cdots & v_{81} \\ \cdot & & \cdot \\ \cdot & & \cdot \\ \cdot & & \cdot \\ v_{1m} & \cdots & v_{8m} \end{bmatrix} \begin{bmatrix} c_{11} \\ \cdot \\ \cdot \\ \cdot \\ c_{18} \end{bmatrix} \quad \text{or } F_x = Vc_1$$

The least squares solution for $c_1$ minimizes the squared error $$E^2 = (F_x - Vc_1)^T (F_x - Vc_1)$$

and from linear algebra, the solution is $$c_1 = (V^T V)^{-1} V^T F_x$$

assuming that the columns of V are linearly independent (that is, $V^T V$ is invertible). As described, this method will find only the first row of the calibration matrix C. But, it is easy to form the least squares solution for the entire C matrix at one time. Specifically, applying multiple forces and moments to the sensor, and recording the voltage output gives $$\begin{bmatrix} F_{x1} & F_{y1} & \cdots & M_{z1} \\ F_{x2} & F_{y2} & \cdots & M_{z2} \\ \cdot & \cdot & & \cdot \\ \cdot & \cdot & & \cdot \\ \cdot & \cdot & & \cdot \\ F_{xm} & F_{ym} & \cdots & M_{zm} \end{bmatrix} =$$

$$\begin{bmatrix} v_{11} & v_{21} & \cdots & v_{81} \\ \cdot & \cdot & & \cdot \\ \cdot & \cdot & & \cdot \\ \cdot & \cdot & & \cdot \\ \cdot & \cdots & & \cdot \\ \cdot & \cdot & & \cdot \\ v_{1m} & v_{2m} & \cdots & v_{8m} \end{bmatrix} \begin{bmatrix} c_{11} & c_{21} & \cdots & c_{61} \\ c_{12} & c_{22} & \cdots & c_{62} \\ \cdot & \cdot & & \cdot \\ \cdot & \cdots & & \cdot \\ \cdot & \cdot & & \cdot \\ c_{18} & c_{28} & \cdots & c_{68} \end{bmatrix}$$

or $F=VC^T$. Then the full calibration matrix is $$C^T = (V^T V)^{-1} V^T F$$

Figure 12:
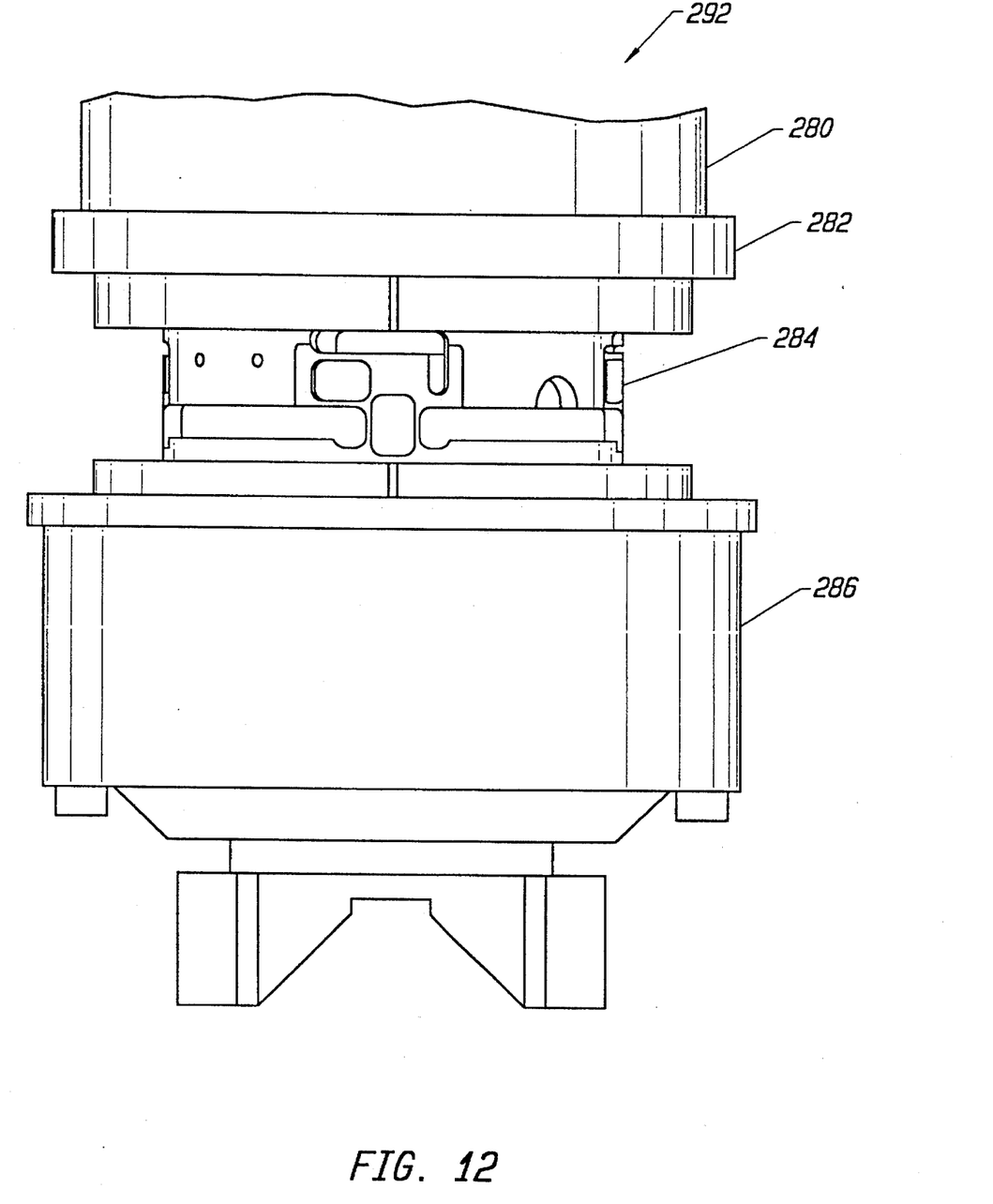
FIG. 12 is an illustration of how a force sensor of this invention may be integrated in a conventional robot arm.

FIG. 12 illustrates a robotics application of a force sensor of this invention. Specifically, a force sensor 284 is integrated in a robot arm 292 which also includes an adapter 282 coupling the responsive end (top) of the force sensor with the remainder of the robot 280. The robot arm 292 may have various functions including handling or grasping items for transport from one location to another, machining various items on an assembly line, cleaning items in a toxic or radioactive environment, etc. Of course, the robot 280 will take various forms and have various elements depending upon its ultimate application. The bottom of force sensor 284 is rigidly coupled to a release unit 286 for separation of the robot arm from the a mount. The forces and moments experienced by robot 280 and determined by force sensor 284 are provided used by a controller (not shown) which can adjust the position of the robot 280 to account for the forces/moments.

Although the foregoing invention has been described in some detail for purposes of clarity of understanding, it will be apparent that certain changes and modifications may be practiced within the scope of the appended claims. For instance, although the specification has described a generally cylindrically sensor body, other shapes can be used as well. For example, a polygonal force sensor body may also be used. In addition, the reader will understand that the force sensors described herein can be used in applications other than robotics. For example, the force sensors here taught may be used in aviation and other transportation applications as well as various other applications.

What is claimed is:

1. A force sensor for measuring forces interacting between bodies connected to opposite sides of the force sensor, on a sensor body structure in at least two dimensions, the force sensor comprising:

an L-shaped leg integrated in the sensor body and having a first arm and a second arm each having a direction substantially perpendicular to that of the other arm, each arm also having a generally planar surface;

a first shear strain gage mounted on the first arm of the L-shaped leg such that the first strain gage primarily measures shear forces which are both parallel to the plane of the first arm and perpendicular to the direction of the first arm;

a second shear strain gage mounted to the second arm of the L-shaped leg such that the second strain gage primarily measures shear forces which are both parallel to the plane of the second arm and perpendicular to the direction of the second arm.

2. The force sensor of claim 1 further comprising a first open section in the first arm of the L-shaped leg, the first open section having a generally U-shaped crosssection including a floor against which the first shear strain gage is mounted.

3. The force sensor of claim 2 further comprising a second open section in the second arm of the L-shaped leg, the second open section having a generally Ushaped cross-section including a floor against which the second shear strain gage is mounted.

4. The force sensor of claim 1 wherein the force sensor includes at least three L-shaped legs each having first and second shear strain gages mounted thereon, wherein the at least three L-shaped legs are arranged in the structure such that the shear strain gages collectively provide information identifying forces acting on the structure along three mutually orthogonal axes and identifying moments about the three axes.

5. The force sensor of claim 4 wherein the structure includes three Lshaped legs and wherein the first and second arms of each L-shaped leg are not coplanar.

6. The force sensor of claim 4 wherein the structure includes four Lshaped legs and wherein the first and second arms of each L-shaped leg are coplanar.

7. The force sensor of claim 6 wherein the sensor body is generally hollow and cylindrical and has an axis parallel to the generally cylindrical surface, and wherein the four L-shaped legs are integrated in the cylindrical surface of the sensor body at locations separated from one another by about 90°.

8. force sensor of claim 7 wherein the four L-shaped legs are oriented on the cylindrical sensor body such that for each L-shaped leg, the first shear strain gage primarily responds to forces acting laterally on the cylindrical surface and the second shear strain gage primarily responds to forces acting in a direction parallel to a principle axis of the cylindrical sensor body.

9. The force sensor of claim 1 wherein the L-shaped leg forms part of a T-shaped leg integrated in the sensor body.

10. The force sensor of claim 9 wherein the T-shaped leg includes three shear strain gages.

11. A method of determining the magnitude and direction of forces applied to a generally hollow and cylindrical force sensor having axial and transverse axes and having three or more legs each of which has at least a first shear strain gage oriented to detect primarily force components in the axial direction and a second shear strain gage oriented to detect primarily force components along one of the transverse axes, the method comprising the following steps:

monitoring shear strain detected by the first strain gages and caused primarily by forces acting in the axial direction and/or moments about one of the transverse axes;

monitoring shear strain detected by the second strain gages and caused primarily by forces acting along one or more transverse axes and/or moments about the axial axis;

processing the shear strains detected by the first and second strain gages to determine the magnitude and direction of any forces and/or moments applied to the force sensor.

12. The method of claim 11 wherein the steps of monitoring shear strain monitor shear strain occurring in pockets in which the strain gages are mounted.

13. The method of claim 11 further comprising a step of adjusting the position of a tool connected to the force sensor in response to the forces determined in the step of processing.

14. The method of claim 11 wherein the step of processing is conducted at least in part by a digital processor located within the cylindrical force sensor.

15. The method of claim 14 wherein the digital processor determines the complete magnitude and direction of any forces and/or moments applied to the force sensor.

16. A force sensor for measuring forces and moments in six degrees of freedom, the force sensor comprising:

a hollow generally cylindrical force sensor body having an axis;

three or more L-shaped legs arranged on the force sensor body;

at least two pockets provided in each L-shaped leg;

a plurality of shear strain gages mounted in the pockets of L-shaped legs, wherein in each leg at least a first shear strain gage is oriented to respond to forces primarily parallel to the sensor body axis and at least a second shear strain gage is oriented to respond to primarily transverse forces which are not parallel to the sensor body axis.

17. The force sensor of claim 16 wherein the force sensor body is a monolithic structure.

18. The force sensor of claim 16 further comprising a digital processor coupled to the shear strain gages, wherein the digital signal processor is programmed to determine from output signals of the plurality of shear strain gages magnitudes and directions of forces and/or moments applied to the force sensor body.

19. The force sensor of claim 16 comprising four L-shaped legs on the force sensor body, each L-shaped leg being angularly spaced from two other adjacent Lshaped legs by about 90°.

20. The force sensor of claim 16 wherein the L-shaped legs are spaced from one another by apertures in the sensor body.

21. The force sensor of claim 16 wherein the L-shaped leg is part of a Tshaped leg which is connected to the force sensor body at three ends.

22. The force sensor of claim 16 further comprising a robot arm connected to said force sensor body.

23. A force sensor for measuring forces interacting between bodies connected to opposite sides of the force sensor, on a sensor body structure in at least two dimensions, the force sensor comprising:

an L-shaped leg integrated in the sensor body and having a first arm and a second arm mutually integrally connected to form the L-shaped leg and each arm having a direction substantially perpendicular to that of the other arm, said first and second arms being connected in series between support regions respectively associated to said opposite sides of the force sensor;

a first shear strain gage mounted on the first arm of the L-shaped leg such that the first strain gage primarily measures shear forces which are perpendicular to the direction of the first arm;

a second shear strain gage mounted to the second arm of the L-shaped leg such that the second strain gage primarily measures shear forces which are perpendicular to the direction of the second arm.

24. A method of determining the magnitude and direction of forces applied to a generally hollow and cylindrical force sensor having axial and transverse axes and having three or more Lshaped legs each of which has a first arm and a second arm mutually integrally connected such that each arm has a direction substantially perpendicular to that of the other arm and each L-shaped leg having at least a first shear strain gage mounted on the first arm and oriented to detect primarily force components in the axial direction and a second shear strain gage mounted on the second arm and oriented to detect primarily force components along one of the transverse axes, the method comprising the following steps:

monitoring shear strain detected by the first strain gages and caused primarily by forces acting in the axial direction and/or moments about one of the transverse axes;

monitoring shear strain detected by the second strain gages and caused primarily by forces acting along one or more transverse axes and/or moments about the axial axis;

processing the shear strains detected by the first and second strain gages to determine the magnitude and direction of any forces and/or moments applied to the force sensor.

25. A force sensor for measuring forces and moments in six degrees of freedom, the force sensor comprising:

a hollow generally cylindrical force sensor body having an axis and mutually oppositely arranged first and second sides;

a first support region and a second support region each respectively associated to a respective one of said opposite sides;

three or more L-shaped legs arranged on the force sensor body, each L-shaped leg having a first arm and a second arm mutually integrally connected such that each arm has a direction substantially perpendicular to that of the other arm, and said first and second arms being connected in series between said first and second support regions;

at least two pockets provided in each L-shaped leg;

a plurality of shear strain gages mounted in the pockets of L-shaped legs, wherein in each leg at least a first shear strain gage is oriented to respond to forces primarily parallel to the sensor body axis and at least a second shear strain gage is oriented to respond to primarily transverse forces which are not parallel to the sensor body axis.

* * * * *